W. J. McCALLUM.
ELEVATING TRUCK.
APPLICATION FILED FEB. 1, 1917.
1,230,739.
Patented June 19, 1917.
2 SHEETS—SHEET 1.
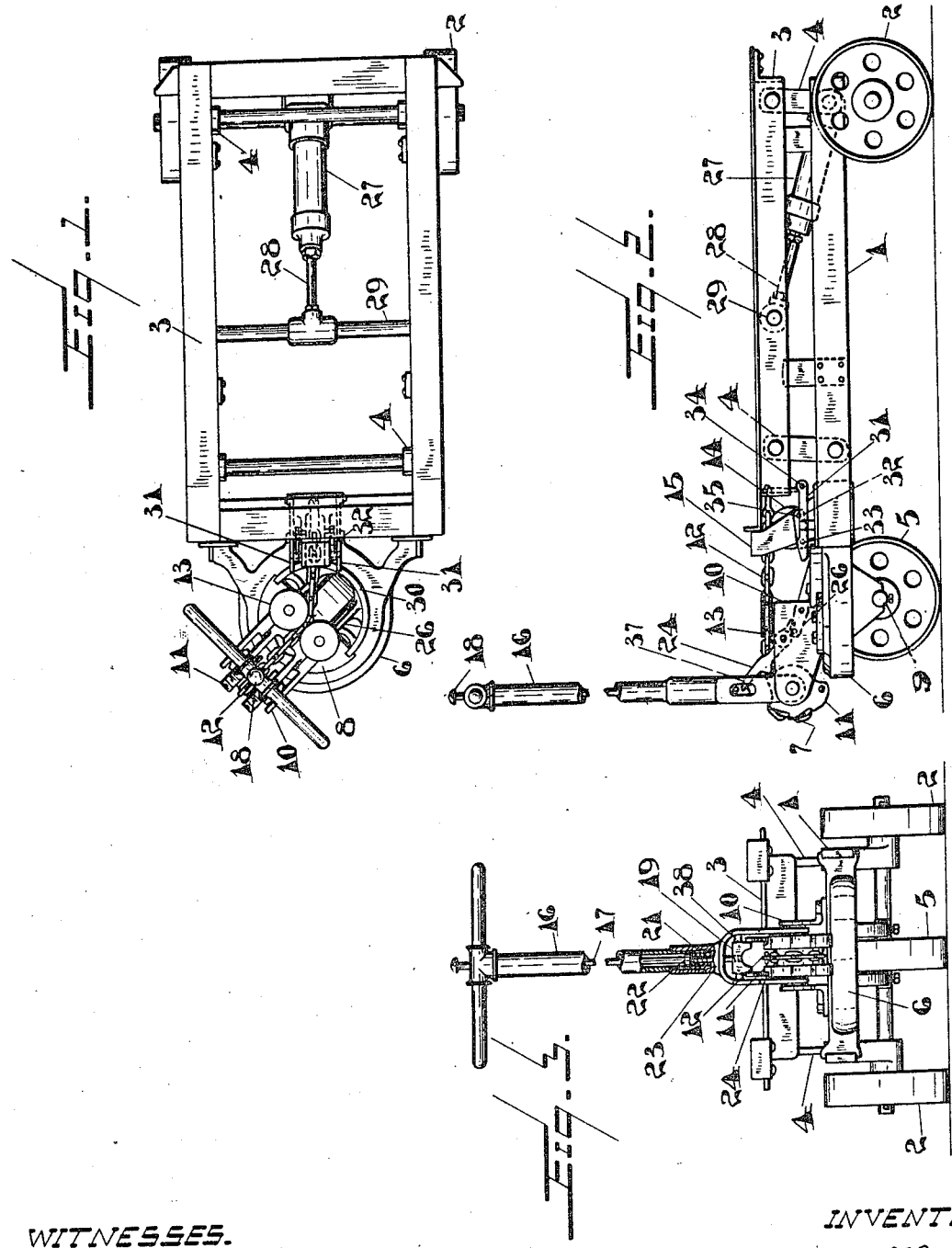
WITNESSES.
N. R. Tyndall.
A. M. Lewis
INVENTOR.
W. J. McCallum
By J. Edward Maybee.
ATTY.

W. J. McCALLUM.
ELEVATING TRUCK.
APPLICATION FILED FEB. 1, 1917.
1,230,739.
Patented June 19, 1917.
2 SHEETS—SHEET 2.
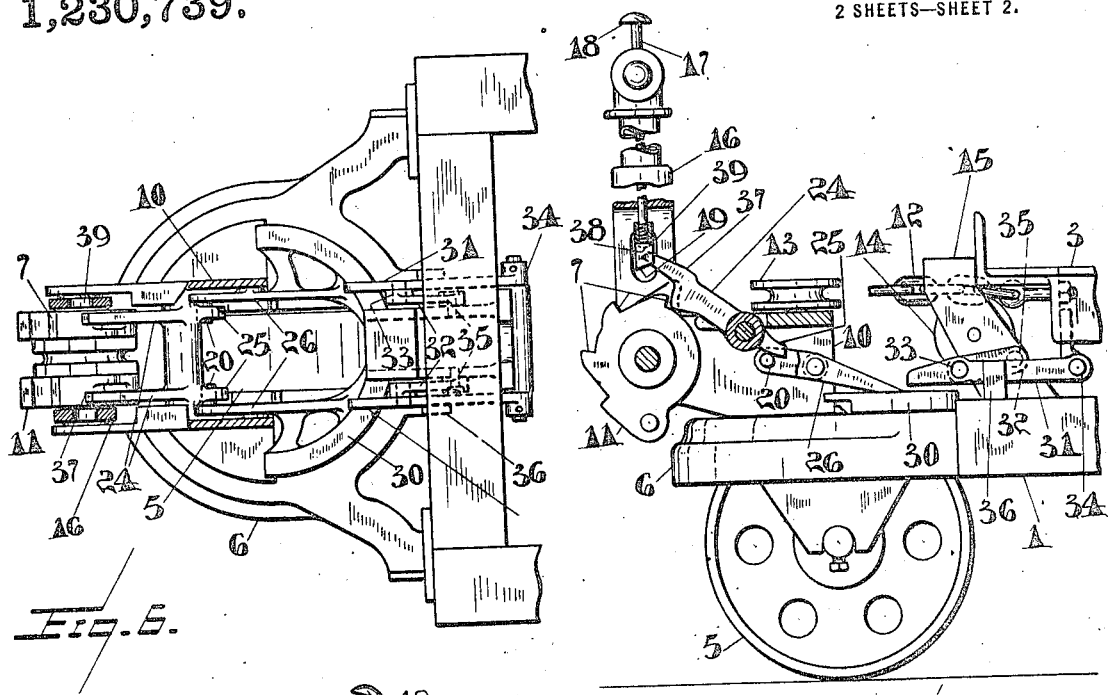
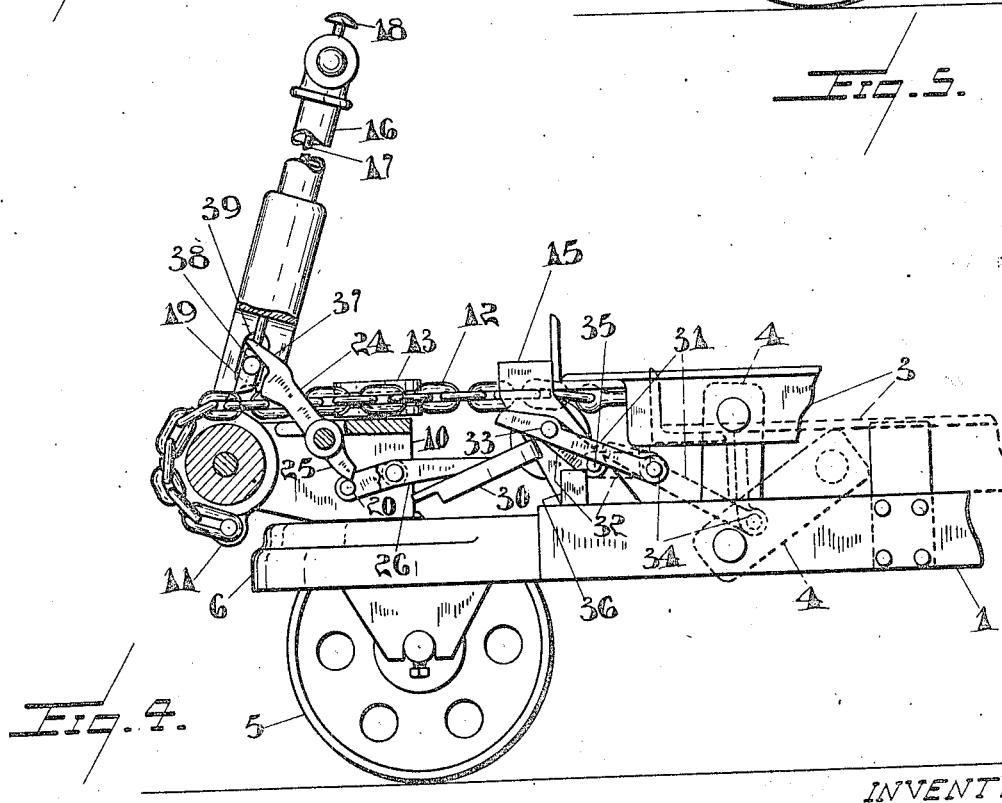
WITNESSES.
N. R. Tyndall.
A. M. Lewis
INVENTOR.
W. J. McCallum
BY J. Edward Maybee
ATTY.

UNITED STATES PATENT OFFICE.

WILLIAM JAMES McCALLUM, OF TORONTO, ONTARIO, CANADA, ASSIGNOR TO THE CHAPMAN DOUBLE BALL BEARING COMPANY OF CANADA, LIMITED.

ELEVATING-TRUCK.

1,230,739.  Specification of Letters Patent.  Patented June 19, 1917.

Application filed February 1, 1917. Serial No. 145,918.

*To all whom it may concern:*

Be it known that I, WILLIAM JAMES Mc-CALLUM, a subject of the King of Great Britain, residing in the city of Toronto, county of York, Province of Ontario, Canada, have invented certain new and useful Improvements in Elevating-Trucks, of which the following is a specification.

This invention relates to trucks provided with vertically movable frames and used with raised platforms on which the goods to be moved are piled, the truck, when the movable frame is lowered, being adapted to pass under the platform, and when the frame is raised, to lift the platform from the ground. A truck of this type is described and claimed in United States Patent No. 1149457 dated August 10th, 1915. In the truck shown and described in the said patent, a chain was used to elevate the platform, said chain being operated by means mounted on a turntable at the front of the truck. In this truck the chain was always under a tension when the load was raised, and this arrangement was found to possess certain disadvantages. In particular, it interfered somewhat with the steering movements of the turntable which carried the steering wheel.

The object of the present invention is to provide means for automatically locking the truck in its raised position, thus relieving the strain on the chain, and for releasing the locking means from the handle which is used to elevate the truck and also as a means by which the truck may be drawn about and steered.

The object of the invention is attained by providing between the stationary and movable frames of the truck a toggle which automatically locks when the movable frame is raised to its highest position, and by providing tripping means for the toggle carried by the turntable and adapted to be operated through suitable connections by means carried by the aforesaid handle.

The invention is hereinafter more specifically described and is illustrated in the accompanying drawings in which—

Figure 1 is a plan view of the truck provided with the improvements;

Fig. 2 a side elevation of the same;

Fig. 3 a front elevation of the same;

Fig. 4 a side elevation of part of the mechanism on an enlarged scale and partly in section;

Fig. 5 a similar view showing the parts in a different position; and

Fig. 6 a plan view of the same parts.

In the drawings like numerals of reference indicate corresponding parts in the different figures.

1 is the main frame of the truck, which will be shaped to support the different parts and provided with suitable rear wheels 2. On this main frame is supported the movable frame 3, which movable frame is supported in any suitable manner so that it may be raised and lowered. Preferably two pairs of links 4 are employed pivoted on the main frame and on the movable frame. By moving the movable frame 3 endwise it will also be moved vertically. The forward end of the main frame is provided with a suitable turntable carrying the wheel 5. This turntable is formed of the yoke 6 secured to the forward end of the frame 1 and by what is termed the housing 8 running on the yoke by means of ball bearings (not shown).

To this housing is secured the axle 9 of the steering wheel 5. The wheel is preferably journaled on the axle by means of ball bearings.

Secured to the housing 8 is the upwardly extending bracket 10. On the forward part of this bracket is journaled the sector 11. Over this sector passes the chain 12, one end of the chain being secured to the sector. The periphery of the sector, it will be noted, is suitably shaped for engagement by the links of the chain and is provided preferably with several ratchet teeth 7. The chain extends rearwardly and is secured to the forward end of the movable frame 3.

Journaled on the bracket 10 are a pair of sheaves or guide pulleys 13. These are journaled side by side with the rearward portion of the gap between them substantially in a vertical line above the center of the axle 9. The chain 12 passes between these guide pulleys and over a roller 14 journaled on the bracket 15 secured to the main frame. The periphery of this roller is grooved to receive the links of the chain, which lie edgewise relative to the roller. It is evident that by suitably rocking the sector 11 that the chain 12 will be drawn up to effect an endwise movement of the movable frame, which results in its being simultaneously moved vertically. It further results that if the turntable be turned to direct the sector toward either side that the chain will be just as effectively drawn up by rocking the sector owing to the manner in which the chain is guided by the sheaves 13, (see particularly Fig. 1).

The main function of the roller 14 is to keep the chain in substantial alinement with the grooves in the sheaves 13 whether the movable frame 3 be up or down.

To effect the movement of the sector 11 the handle 16 is utilized, which also serves as a means by which the truck may be drawn about. This handle is yoke-shaped at its lower end and is fulcrumed concentric with the sector 11. The handle is provided with any suitable means by which it may be given an operating engagement with the sector 11. Preferably a rod 17 is provided sleeved within the handle and projecting through the handle at its upper end where it is provided with a button 18. The lower end of this rod is provided with a fork 19 which straddles the chain 12. When the rod is pressed down the fork 19 is brought into position to engage with a pair of ratchet teeth 7 formed on the sector 11. Normally the rod is held up to hold the fork 19 out of the path of the teeth 7 by means of a coil spring 21, which engages a collar 22 secured to the rod and a shoulder 23 formed on the handle.

The movable platform is elevated by pressing down the rod 17 until the fork 19 comes in the path of the teeth 7. Then by drawing down the handle, the sector may be moved, and, by the connections described, the movable frame is raised. To hold the parts after such downward movement of the handle, a forked dog 24 is provided pivoted on the bracket 10 and adapted to engage the ratchet teeth 7. Several pairs of ratchet teeth being provided, the movable frame may be raised by several oscillatory movements of the handle 16 through a comparatively small arc. The dog 24, it will be noted, is provided with tails 25, which are located just above the pins or projections 20 on the lever 26 fulcrumed on the bracket 10 of the turntable. The forward part of this lever is necessarily forked to enable it to be engaged by both of the tails 25. Of course, only one point of engagement is absolutely necessary, but for the sake of strength and durability the double arrangement is preferred.

The rearward end of the lever 26 is formed as shown of a segment of an arc 30, and lies below part of a toggle which is adapted to hold the movable frame in its raised position. This toggle comprises the levers 31 and 32 pivoted together at 33. The lever 31 is also pivoted at 34 on the forward end of the movable frame, while the lever 32 is pivoted at 35 on the bracket 15 or other part of the stationary frame. The parts are so proportioned that when the frame is raised as shown in full lines in Fig. 5, the pivot 35 is above an imaginary line joining the pivots 33 and 34, so that the weight of the movable frame and any load thereon tends to draw down the link 32. Downward movement is prevented by allowing the toggles to rest on some stationary part, such as 36, on the movable frame.

Two toggles, it will be seen, are used one on each side of the bracket 15, and it is the forward ends of the levers 31 of the toggles which lie over the arc-shaped segment 30 of the lever 26. The lever 26 may be operated in any suitable way to trip the toggles. It is preferred, however, to provide means whereby the handle may be used to effect the tripping preferably through the medium of the dog 24. This dog 24 is provided preferably at each end with a forwardly extending tongue 37. The fork 19 is provided at each side with lateral projections 38 projecting through a slot 39 in the side of the handle. When the rod 17 is pressed down, the projections 38 may be brought below the tongues 37. If then the handle is moved back as shown in Fig. 4, the forked dog 24 will be lifted, the lever 26 rocked and the toggle tripped to release the movable frame. The parts are preferably so proportioned that when the movable frame has been raised to its limit the sector 11 has been rocket sufficiently far to move the last ratchet teeth 7 thereon forward of an engaging position with the dog 24. Consequently, when the handle is released from engagement with the sector, the chain is left with sufficient slack so that there is no strain whatever on it when the sector is being turned by the handle in the process of drawing and steering the truck. The turntable has thus perfect freedom of movement and the chain is only under tension during the operation of raising the movable frame with its load.

It will thus be seen that a construction has been described which will satisfactorily attain the objects of the invention as set out in the preamble of this specification.

To ease the downward movement of the movable frame when a load is upon it, a dash pot, which may be of any ordinary type, is provided. The cylinder 27 is pivoted on the rear axle or any other suitable cross bar of the stationary frame, and the piston rod 28 is pivotally connected with the cross bar 29 of the movable frame.

What I claim as my invention is:

1. In an elevating truck, the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; a handle fulcrumed in operative relationship to the rocking member; means for operatively connecting the handle and the rocking member at will; a toggle adapted to lock the movable frame in its raised position; and tripping means for the toggle carried by the turntable and adapted to maintain an operative relationship to the said toggle as the turntable is swung.

2. In an elevating truck, the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; a handle fulcrumed in operative relationship to the rocking member; means for operatively connecting the handle and the rocking member at will; a toggle adapted to lock the movable frame in its raised position; and tripping means for the toggle carried by the turntable and adapted to maintain an operative relationship to the said toggle as the turntable is swung, the means for operatively connecting the handle and rocking member being adapted also to engage and operate the tripping means for the toggle lever when the handle is moved rearwardly.

3. In an elevating truck, the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; a handle fulcrumed in operative relationship to the rocking member; one or more ratchet teeth formed on said rocking member; a dog adapted to engage said tooth or teeth to normally prevent backward movement of the rocking member; a toggle adapted to automatically lock the movable frame in its raised position; a tripping lever for the toggle carried by the turntable and adapted to maintain an operative relationship to the said toggle as the turntable is swung; means for operatively connecting the handle and the rocking member at will, said means being adapted also to be positioned to engage and raise the dog clear of the teeth of the rocking member when the handle is moved rearwardly, the dog being adapted when so raised to engage and operate the tripping lever.

4. In an elevating truck, the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; a handle fulcrumed in operative relationship to the rocking member; one or more ratchet teeth formed on said rocking member; a dog adapted to engage said tooth or teeth to normally prevent backward movement of the rocking member; a toggle adapted to automatically lock the movable frame in its raised position; a tripping lever for the toggle carried by the turntable having an arc shaped end in operative relationship to the toggle; means for locking the handle to the rocking member comprising a bolt slidable lengthwise of the handle and adapted to engage the teeth of the rocking member; a tail on the dog aforesaid adapted to engage and rock the aforesaid toggle tripping lever; and a projection on the rod aforesaid adapted, when the rod is pushed down and the handle pushed backward sufficiently to engage the dog and raise it to actuate the toggle tripping lever.

5. In an elevating truck, the combination of the main frame; a frame mounted on said main frame so as to move vertically when moved horizontally; a rocking member mounted on the main frame to swing in a vertical plane; a flexible connection between said rocking member and the movable frame; one or more ratchet teeth formed on said rocking member; a dog adapted to engage said tooth or teeth to normally prevent backward movement of the rocking member; a toggle adapted to automatically lock the movable frame in its raised position; and tripping means for the toggle supported from the main frame, the aforesaid dog being adapted when raised clear of the teeth of the rocking member to engage and operate the tripping means.

6. In an elevating truck, the combination of the main frame; a frame mounted on said main frame so as to move vertically when moved horizontally; a rocking member mounted on the main frame to swing in a vertical plane; a flexible connection between said rocking member and the movable frame; one or more ratchet teeth formed on said rocking member; a dog adapted to engage said tooth or teeth to normally prevent backward movement of the rocking member; a toggle adapted to automatically lock the movable frame in its raised position; tripping means for the toggle supported from the main frame, the aforesaid dog being adapted when raised clear of the teeth of the rocking member to engage and operate the tripping means; a handle fulcrumed in operative relationship to the rocking member; means for locking the handle to the rocking member comprising a bolt slidable lengthwise of the handle and adapted to engage the teeth of the rocking member; a tail on the dog aforesaid adapted to engage and rock the aforesaid toggle tripping means; and a projection on the rod aforesaid adapted, when the rod is pushed down and the handle pushed backward sufficiently to engage the dog and raise it to actuate the toggle tripping means.

7. In an elevating truck, the combination of the main frame; a frame mounted on said main frame so as to move vertically when moved horizontally; a rocking member mounted on the main frame to swing in a vertical plane; a flexible connection between said rocking member and the movable frame; a handle fulcrumed in operative relationship to the rocking member; means for operatively connecting the handle and the rocking member at will; a toggle adapted to lock the movable frame in its raised position; and tripping mechanism for the toggle supported from the main frame, the means for operatively connecting the handle and the rocking member being adapted also to engage and operate the tripping mechanism for the toggle when the handle is moved rearwardly.

8. In an elevating truck, the combination of the main frame; a frame mounted on said main frame so as to move vertically when moved horizontally; a rocking member mounted on the main frame to swing in a vertical plane; a flexible connection between said rocking member and the movable frame; a handle for operating said rocking member; a toggle adapted to lock the movable frame in its raised position; tripping mechanism for tripping the toggle supported from the main frame; and means carried by the handle adapted to be engaged with the tripping mechanism, when the handle is moved rearwardly, to cause the toggle tripping mechanism to trip the toggle.

Signed at Toronto, Canada, this 30th day of Nov. 1916.

WILLIAM JAMES McCALLUM.